United States Patent [19]

Ritchey et al.

[11] 3,765,177
[45] Oct. 16, 1973

[54] ROCKET MOTOR WITH BLAST TUBE AND CASE BONDED PROPELLANT

[75] Inventors: Harold W. Ritchey, Huntsville, Ala.; John M. McDermott, Brigham City, Utah

[73] Assignee: Thiokol Chemical Corporation, Bristol, Pa.

[22] Filed: Dec. 30, 1959

[21] Appl. No.: 857,642

[52] U.S. Cl................. 60/253, 86/1, 102/103, 60/219, 264/3
[51] Int. Cl................................. F02k 9/04
[58] Field of Search............... 60/35.6, 253; 102/34, 34.5, 49, 98, 103; 86/1

[56] References Cited
UNITED STATES PATENTS

| | | | |
|---|---|---|---|
| 2,937,595 | 5/1960 | Margulis et al. | 60/35.6 |
| 2,972,859 | 2/1961 | Porcher | 60/35.6 |
| 2,816,721 | 12/1957 | Taylor | 60/35.6 |

OTHER PUBLICATIONS

"1958 Missle Materials Review" by A. J. Zaehringer and R. M. Nolan, Published in Missiles and Rockets, Mar. 1958, Vol. 3, No. 3, pp. 69–75.

"Solid Fuels Contend for Long Range Ballistic Role" by J. S. Rutz, Jr., Aviation Week, Oct. 7, 1957. Pages 50, 51 and 52.

"A Quasi–Morphological Approach to the Geometry of Charges for Solid Propellant Rockets: The Family Tree of Charge Designs" by J. M. Vogel, Jet Propulsion, Vol. 26, No. 2, pages 102–105, Feb. 1956.

*Primary Examiner*—Samuel Feinberg
*Attorney*—Gordon K. Lister

EXEMPLARY CLAIM

2. A multiple end-burning rocket comprising a motor casing closed at its forward end and having rearward nozzle means, at least one propellant charge therein case-bonded to said motor casing and having a plurality of end-burning surfaces, and a hollow blast tube extending through said propellant charge and to which said charge is bonded, said tube being expansible and contractible in response to changes in the dimensions of said propellant charge, and said blast tube comprising a cured mixture of a liquid bisphenol epoxide polymer and a liquid polythiopolymercaptan polymer.

5 Claims, 3 Drawing Figures

INVENTORS
H. W. RITCHEY
J. M. MCDERMOTT
BY
*Gordon K. Lister*
ATTORNEY

ROCKET MOTOR WITH BLAST TUBE AND CASE BONDED PROPELLANT

This invention relates to solid propellant rocket motors, and relates in particular to solid propellant rocket motors in which the propellant burns simultaneously at a plurality of end surfaces, and to methods of making such rocket motors.

Solid propellant rocket motors commonly comprise a partially closed cylindrical motor casing having a propellant charge therein. The propellant charge is preferably bonded to the walls of the motor casing. Case bonding is conveniently accomplished by filling the casing with a fluid curable propellant composition and curing in situ. As known in the art, such propellant compositions commonly comprise a combustible organic material capable of polymerizing, for example materials of the polyurethane, polyester, or polyether types, and containing 65-95 parts by weight of a solid oxidizing agent mixed therewith. At one end the casing is provided with a nozzle through which hot gases evolved by combustion of the solid propellant pass to produce the motive impulse which drives the rocket. The configuration of the solid propellant charge is an important variable affecting the amount of thrust generated by the rocket.

To obtain high thrust values, a longitudinal internal burning configuration has commonly been used for rocket propellant charges. If the propellant composition has a high burning rate, however, such a charge configuration may not allow a long enough burning time. The use of a slower burning propellant, on the other hand, limits the thrust available at a given time during the sustainer period of motor operation. Consequently it has proved desirable to find a way to achieve both high thrust and longer burning time when using a propellant having a high burning rate.

A transverse or end-burning propellant charge has been suggested to achieve this end. However, such charges have been more the exception than the rule in rocket motor technology, because the relatively small cross-sectional area of the burning charge limits the thrust obtainable. Heretofore, high thrust values have not been feasible using an end-burning propellant charge without an undesirable increase in the cross-sectional area of the charge — and hence also the diameter of the motor casing containing the charge.

However, the burning area of a propellant charge in an end-burning motor can be increased, without enlarging the diameter of the motor casing, by simultaneously burning more than a single end surface of the propellant charge. Such a procedure encounters certain technical difficulties. For example, to increase the thrust of an end-burning propellant charge by causing burning to take place at both the forward and the aft end of the charge, combustion products from the forward end-burning surfaces of the charge must be conducted to the nozzle or aft end of the rocket motor by a duct extending through or around the propellant charge. A peripheral duct presents serious difficulties in supporting the charge inside the motor casing, and also requires insulation of both the charge and the casing. The charge must be insulated because hot gases traveling past it at high velocity from the forward end of the motor are apt to cause ignition and burning of the propellant along the sides of the charge, thereby interfering with the intended program of thrust and burning time. Insulation of the motor casing is also required to protect the casing from the eroding effects of the hot gases from the forward end of the burning propellant charge.

The use of a central duct in a multiple end burning rocket overcomes many of the difficulties inherent in the use of a peripheral duct. Such a central duct or tube extending through the center of a propellant charge conducts combustion products from forward burning surfaces back to the nozzle of a rocket holding the charge.

The present invention concerns a multiple endburning rocket having a central, heat resistant duct or blast tube for conveying gases from forward burning surfaces of a propellant charge through intermediate portions of the charge. These gases are led into a rearward chamber of the rocket and eject through the nozzle of the rocket. Gases generated in forward portions of the rocket thereby contribute to the thrust provided by gases simultaneously evolved at rearward burning surfaces of the propellant charge.

A better understanding of the invention and an appreciation of its many advantages may be had by reference to the accompanying drawings. In these drawings, FIG. 1 is a side elevation in longitudinal section of a double end-burning rocket motor;

Figure 1:
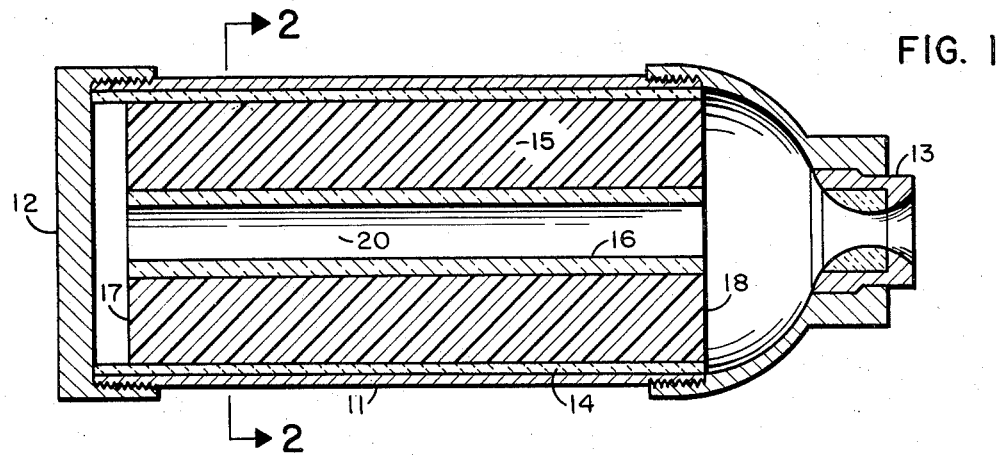
Figure 2:
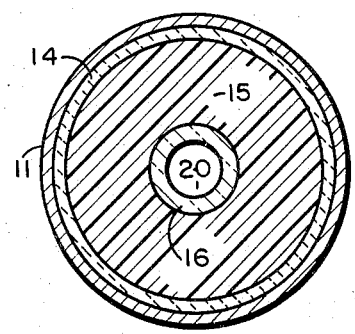
FIG. 2 is a front elevation of the same motor in transverse section taken along the line 2—2 of FIG. 1.
Figure 3:
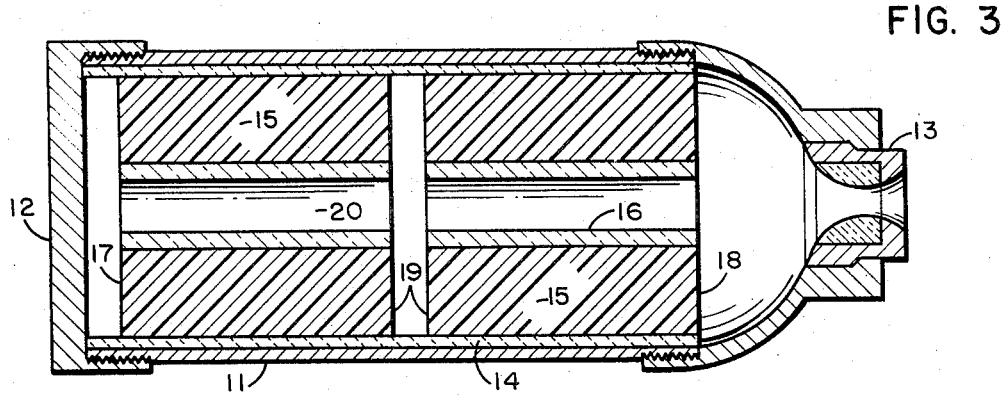
FIG. 3 is a side elevation in longitudinal section of another embodiment of a rocket motor, in which embodiment the propellant charge has four transverse burning surfaces.

FIGS. 1-3 show rockets comprising motor casing 11, advantageously of cylindrical shape, forward closure 12, and nozzle means 13. Within casing 11 is an insulating liner 14 of a refractory material. In more interior portions of casing 11 is propellant charge 15, which may be of a variety of solid propellant compositions known to the art such as a combustible organic resin, e.g. polystyrene, mixed with an oxidizing agent, e.g. ammonium perchlorate. Propellant charge 15 surrounds centrally mounted duct 16, which extends from the forward to the aft end of the charge. In the rockets of FIGS. 1 and 3, propellant charge 15 has forward and aft burning surfaces 17 and 18. In addition, charge 15 of the rocket of FIG. 3 has in its middle portions two more burning surfaces 19. Hot gases from burning surfaces 17 and 19 are conducted through hollow interior 20 of duct 16 to nozzle portions 13 of the rockets. The propellant charge is initially ignited at the surfaces to be burned using conventional igniter means (not shown in the drawings), for example either of the chemical or electrical types.

In conducting the hot gases from the forward burning portions of the propellant charge through the central duct or blast tube to the rearward nozzle, ignition and burning of that part of the propellant charge between the multiple burning ends is to be avoided. If the intermediate portion of propellant charge does ignite and burn, a rapid rise in the total pressure of the combustion gases can be caused. Such a rapid rise in pressure may be sufficient to burst the motor casing. Also, if any part of the propellant charge except the intended burning surfaces are ignited, the planned program of thrust and burning time for the motor may be altered.

To avoid ignition of intermediate portions of the propellant charge, the central duct or blast tube may be made of ceramic, or of metal, or of some other such nonflammable and relatively heat-resistant material. However, blast tubes of this type are relatively heavy and contribute extra weight to the rocket. Also, in the process of bonding the propellant charge to the motor casing, the propellant may tend to shrink away from the blast tube during the curing period. This phenomenon may be encountered if the blast tube is made of a material of high elastic modulus. Furthermore, as the motor is heated up by the combustion taking place during firing, temperature stresses may be set up between such metallic or ceramic blast tubes and the propellant charge. Cracking of the propellant charge and subsequent uneven burning or runaway conditions may ensue.

It has been discovered that the use of a light weight, heat resistant, synthetic resinous material in the blast tube is to be preferred. A tube of this type obviates many of these difficulties attendent upon the use of ceramic or metal. The synthetic resinous materials herein considered for use in a blast tube have a lower density than suitable metals, and also possess those physical properties which allow expansion and contraction of such a tube with a propellant charge in contact with it, so that a uniform, void-free contact between the tube and charge is obtained. The blast tube materials can expand or contract with the propellant charge, permitting accommodation to temperature changes over a wide range. The synthetic resinous compositions have a low thermal conductivity and can provide a much more effective barrier to heat flow than can a refractory type material such as metal or ceramic. The resin compositions decompose pyrolytically in an endothermic reaction at moderate temperatures to leave a coherent ash of high melting point and low thermal conductivity.

For example, a heat resistant, synthetic resinous composition of this type is one made from a cured mixture of a liquid polyepoxy compound and a liquid organic polysulfide polymer with an inorganic refractory filler. Such compositions advantageously contain between about 50 parts by weight to about 90 parts by weight of the polyepoxy compound and between about 50 parts and about 10 parts by weight of polysulfide polymer. The filler content is advantageously between about 30 per cent by weight to about 45 per cent by weight of the total mixture, which is cured with about 10 per cent by weight of an alkaline curing agent, preferably an amine or polyamine, primary, secondary or tertiary.

The epoxy materials preferred for use in the manufacture of the expansible and contractible blast tubes are monomeric or partially polymerized polyglycidyl ethers produced by the reaction of an epoxy compound, such as epichlorohydrin, with a polyglycol or polyphenol, such as glycerine of the dihydroxydiphenylmethanes. Materials of this type, which are commonly prepared by reacting two or more molar proportions of epichlorohydrin with one molar proportion of a polyglycol or polyphenol in the presence of an alkali to neutralize hydrochloric acid produced in the reaction, are described, for example, in U.S. Pat. No. 2,506,486 issued May 2, 1950 to Bender, Farnham and Guyer. Products such as these are commerically available under such tradenames as "Araldite 504," made by the CIBA Company, or the "Epon" resins such as "Epon 828," "Epon 562" made by the Shell Chemical Corporation, "Epirez 510," a product of the Jones-Dabney Company, "ERL 2794," a product of Union Carbide and Carbon Company, etc.

The liquid organic polysulfide polymers are, for example, those disclosed in U.S. Pat. No. 2,466,963 to Patrick et al., and may be conveniently described as polythiopolymercaptan liquid polymers. A representative polymer of this type is marketed by the Thiokol Chemical Corporation under the name "Thiokol" LP33.

Numerous inorganic fillers can be added to the resin compositions, including mineral oxides, glass fibers, carbon black, graphite, and asbestos, for example. Asbestos is a preferred material and is advantageously incorporated into these compositions in the form of fibers, and preferably as S-floats.

A preferred composition of the type described is given below:

| Ingredient | Parts by Weight |
| --- | --- |
| Liquid polyepoxy compound ("Araldite 504") | 33 |
| Liquid polythiopolymercaptan polymer ("Thiokol" LP33) | 22 |
| Inorganic filler (Asbestos S-floats) | 42 |
| Amine catalyst (2,4,6-tri-dimethylaminomethyl phenol) | 3.3 |

The preferred blast tubes are prepared by casting mixtures of the kind descirbed in appropriate molds and letting the mixtures harden. The blast tubes are then positioned within a rocket casing and a case bonding propellant composition cast thereabout. When blast tubes or ducts of the expansible and contractible materials taught are used, the difficulties of bonding to the tubes, often experienced when metal or ceramic tubes are employed, are obviated.

Upon ignition of the rocket, blast tubes of the preferred expansible and contractible materials freely conduct the hot gases generated from forward burning portions of the propellant charge to posterior portions. The compositions, which are believed to char in surface portions leaving a refractory ash, effectively insulate intermediate portions of the propellant charge which surround the tube so that no ignition of these non-surface portions of the charge occurs. Despite extreme temperature differentials, the blast tubes made from the synthetic polymers remain bonded to the propellant charge, accommodating to volume changes in the latter.

Although specific embodiments have been herein shown and described, it is to be understood that they are illustrative, and are not to be construed as limiting on the scope and spirit of the invention.

What is claimed is:

1. A multiple end-burning rocket comprising a motor casing, closed at its forward end and having rearward nozzle means, a propellant charge therein bonded to said motor casing and having a plurality of end burning surfaces, and a hollow heat resistant elastic central duct in said propellant charge for conducting gases from anterior to posterior portions of said rocket, said charge being bonded to said duct, and said duct comprising a cured composition comprising between about 50 parts and 90 part by weight of a liquid polyepoxy compound, between about 50 parts and 10 parts by weight of a liquid polythiopolymercaptan polymer, about 10 per cent by weight of 2,4,6-tri-dimethylaminomethyl phenol based on the weight of epoxide resin, and between about 30 per cent and 45 per cent by weight of asbestos filler, based on the total weight of the mixture.

2. A multiple end-burning rocket comprising a motor casing closed at its forward end and having rearward nozzle means, at least one propellant charge therein case-bonded to said motor casing and having a plurality of end-burning surfaces, and a hollow blast tube extending through said propellant charge and to which said charge is bonded, said tube being expansible and contractible in response to changes in the dimensions of said propellant charge, and said blast tube comprising a cured mixture of a liquid bisphenol epoxide polymer and a liquid polythiopolymercaptan polymer.

3. A rocket as in claim 2 wherein said cured mixture additionally comprises a refractory solid mixed with said polymers.

4. The method of making a multiple end-burning rocket motor which comprises centrally positioning a hollow duct of a cast heat resistant synthetic resin within a motor casing, said resin comprising a bisphenol epoxide polymer and a polythiopolymercaptan polymer, and casting thereabout a case-bonding propellant charge having anterior and posterior end-burning surfaces, said duct being expansible and contractible in response to changes in the dimensions of said propellant charge.

5. The method as in claim 4 wherein said resin additionally comprises a refractory solid mixed with said polymers.

* * * * *